(12) United States Patent
Dutton (10) Patent No.: US 8,757,228 B2
(45) Date of Patent: Jun. 24, 2014

(54) INTERLOCKING COMPRESSIBLE, PAIRED SPOKE WHEEL SYSTEM

(76) Inventor: Drew J. Dutton, Austin, TX (US)

( * ) Notice: Subject to any disclaimer, the term of this patent is extended or adjusted under 35 U.S.C. 154(b) by 275 days.

(21) Appl. No.: 13/074,394

(22) Filed: Mar. 29, 2011

(65) Prior Publication Data

US 2011/0240189 A1 Oct. 6, 2011

Related U.S. Application Data

(60) Provisional application No. 61/318,816, filed on Mar. 30, 2010.

(51) Int. Cl.
*B60B 9/02* (2006.01)
(52) U.S. Cl.
USPC .......................................... 152/10
(58) Field of Classification Search
USPC ........... 152/1, 5, 7, 11, 12, 69, 70, 76, 80, 81, 152/82, 84, 85, 86, 246, 256, 258, 259, 270, 152/273, 275, 280
See application file for complete search history.

(56) References Cited

U.S. PATENT DOCUMENTS

| | | | | |
|---|---|---|---|---|
| 1,167,757 A | * | 1/1916 | Hess | 152/11 |
| 1,389,938 A | * | 9/1921 | Cohen | 152/12 |
| 1,456,275 A | * | 5/1923 | Kelly | 152/84 |
| 1,639,827 A | * | 8/1927 | Wayne | 152/6 |
| 4,350,196 A | | 9/1982 | Hampshire | |
| 4,558,727 A | | 12/1985 | Golata et al. | |
| 4,769,810 A | | 9/1988 | Eckberg, Jr. et al. | |
| 4,784,201 A | | 11/1988 | Palinkas et al. | |
| 4,832,098 A | | 5/1989 | Palinkas et al. | |
| 4,921,029 A | | 5/1990 | Palinkas et al. | |
| 4,934,425 A | | 6/1990 | Gajewski et al. | |
| 4,936,365 A | * | 6/1990 | Chrobak et al. | 152/452 |
| 4,966,212 A | | 10/1990 | Hill | |
| 5,050,656 A | * | 9/1991 | Ho | 152/11 |
| 5,053,095 A | | 10/1991 | Hill | |
| 5,265,659 A | | 11/1993 | Pajtas et al. | |
| 5,353,853 A | | 10/1994 | Hansson | |
| 5,743,316 A | | 4/1998 | Chrobak | |
| 6,089,292 A | | 7/2000 | Hill, III | |
| 6,616,885 B2 | | 9/2003 | Lombardi et al. | |
| 7,013,939 B2 | | 3/2006 | Rhyne et al. | |
| 7,201,194 B2 | | 4/2007 | Rhyne et al. | |
| 8,109,308 B2 | * | 2/2012 | Manesh et al. | 152/326 |
| 8,176,957 B2 | * | 5/2012 | Manesh et al. | 152/326 |

OTHER PUBLICATIONS

Grabianowski, Ed, "How the Tweel Airless Tire Works," May 10, 2007, HowStuffWorks.com, http://auto.howstuffworks.com/tweel-airless-tire.htm, 3 pages. (Retrieved Jun. 13, 2011).

* cited by examiner

*Primary Examiner* — S. Joseph Morano
*Assistant Examiner* — Jean Charleston
(74) *Attorney, Agent, or Firm* — Meyertons Hood Kivlin Kowert & Goetzel, P.C.; Jeffrey C. Hood (57) ABSTRACT

An interlocking, compressible spoke wheel system having a ring of paired spokes. The locking of left and right spokes into pairs provides improved tire displacement under loads. The left and right half wheels formed by sets of left spokes and right spokes. enable a novel mounting system for the wheel rim or tire to attach to the spoke system.

6 Claims, 10 Drawing Sheets

INTERLOCKING COMPRESSIBLE, PAIRED SPOKE WHEEL SYSTEM

PRIORITY CLAIM

This application claims benefit of priority of U.S. Provisional Patent Application Ser. No. 61/318,816 titled "Interlocking Compressible, Paired Spoke Wheel System", filed on Mar. 30, 2010, whose inventor was Drew J. Dutton, and which is hereby incorporated by reference in its entirety as though fully and completely set forth herein.

BACKGROUND OF THE INVENTION

1. Field of the Invention

This invention relates to vehicle wheel and tire technology and, more particularly, to improved wheel and tire systems for non-pneumatic tires and pneumatic, low profile tires.

2. Description of the Related Art

Most vehicles utilize wheels and tires to control the motion of the vehicle and absorb and transmit the forces associated with the vehicle's mobility. The typical wheel and tire system comprises a solid circular structure, the wheel, mounted to an axle of the vehicle. A tire, typically made of rubber, is mounted on the wheel structure at the point called the rim of the wheel. The tire is generally held in place on the wheel by a combination of the tire's inner structural support members, comprising partly of the tire bead and cord, and air pressure. Sufficient air pressure is required to maintain the proper shape of the tire and maintain sufficient friction between the tire and the rim to prevent separation of the two. The loss of air can lead to catastrophic failure of the wheel and tire structure, resulting in injury and property damage.

Several attempts have been made to reduce or eliminate this risk associated with air filled, or pneumatic tires. Several alternative solutions exist. The most common, partial solution is provided by what are called Run-Flat Tires. These tires provide additional structural elements within the tire to prevent catastrophic failure in the event of loss of air pressure. Currently, these have limitations such as speed and distance traveled after the event of air loss. Some companies have developed non-pneumatic tire and wheel combinations that utilize flexible structures such as plastic honeycomb shapes to replace the compliance, or ride softening provided by pneumatic tires. However, these solutions have several disadvantages in certain applications. The tire component of this solution is typically bonded to the compressible portion of the system. This limits the ability to replace worn tire tread as easily as it is with today's wheel and pneumatic tire structure. In addition, the dynamic compression of these solutions may not support the desired handling response and low rolling resistance. Lastly, few of these designs have shown significant weight savings, a key factor in reducing fuel and other operating costs of a vehicle. Lastly, the class of Large Load Hauling Trucks such as the Caterpillar 797 must have minimal down time and eliminating the risk of down time due to flat tires has significant value for industry.

To proliferate the use of non-pneumatic tires, a solution is required that meets or exceeds current wheel and tire performance and weight characteristics without significant additional costs. In addition, current high performance wheel and tire combinations provide performance at the cost of ride comfort. The ideal solution would also improve handling performance while improving ride comfort.

SUMMARY

Various embodiments of an interlocking and compressible spoke pair based wheel and tire solution are presented here. In one embodiment, the spoke system provides support for a non-pneumatic tire. This tire provides a mating structure to the paired spoke system. In a second embodiment, the paired spoke system provides support for a more standard wheel rim solution. This wheel rim provides a mating structure for the spoke system. In both example embodiments, the spoke system includes a configuration to mate pairs of spokes to each other and a central hub mounting structure.

BRIEF DESCRIPTION OF THE DRAWINGS

FIGS. 7a, 7b and 7c are three diagrams of one embodiment of a tire (300) with wheel attachment structure (310). FIG. 7c is a close-up view of the portion of FIG. 6b showing the retention slot (320) where the spoke lateral plates (120 and 130) mount;

FIGS. 8a and 8b show one embodiment of a complete wheel and tire assembly.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
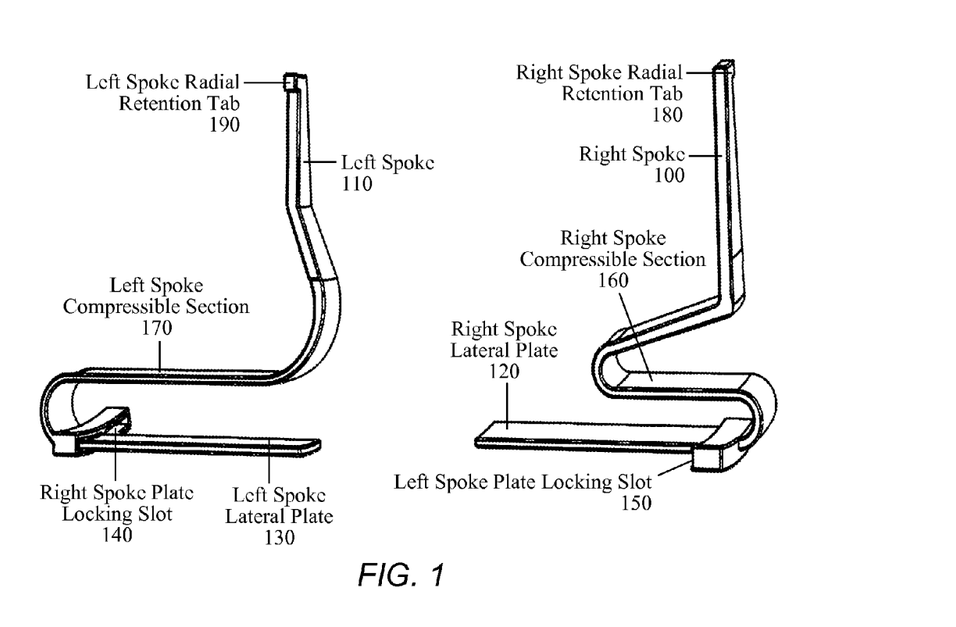
FIG. 1 is a side diagram of one embodiment of a pair of curved, compressible radial spokes (100 and 110) which include a bottom, lateral plate (120 and 130) and locking slot (140 and 150)
Figure 2:
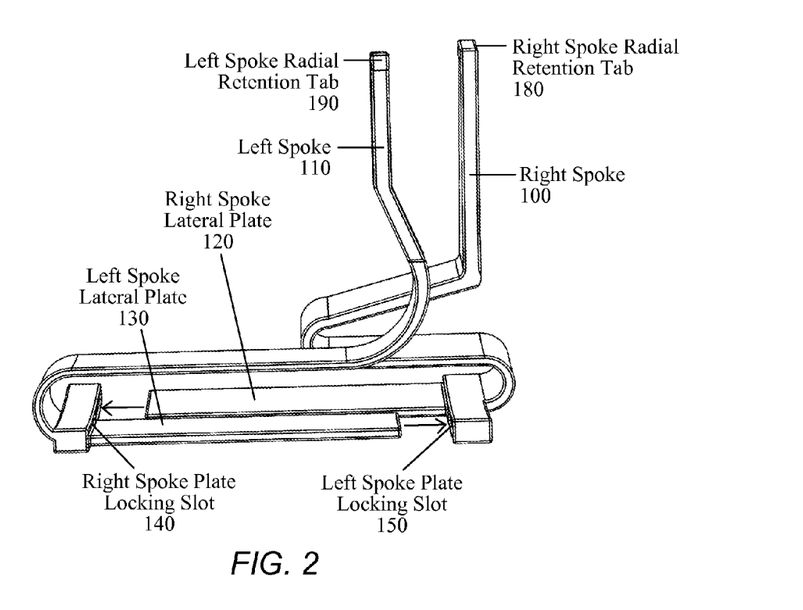
FIG. 2 is a side diagram of one embodiment of a pair of curved, compressible radial spokes (100 and 110) which shows the alignment of the bottom, lateral plates (120 and 130) and locking slots (140 and 150) to lock the two spokes into a pair.
Figure 3:
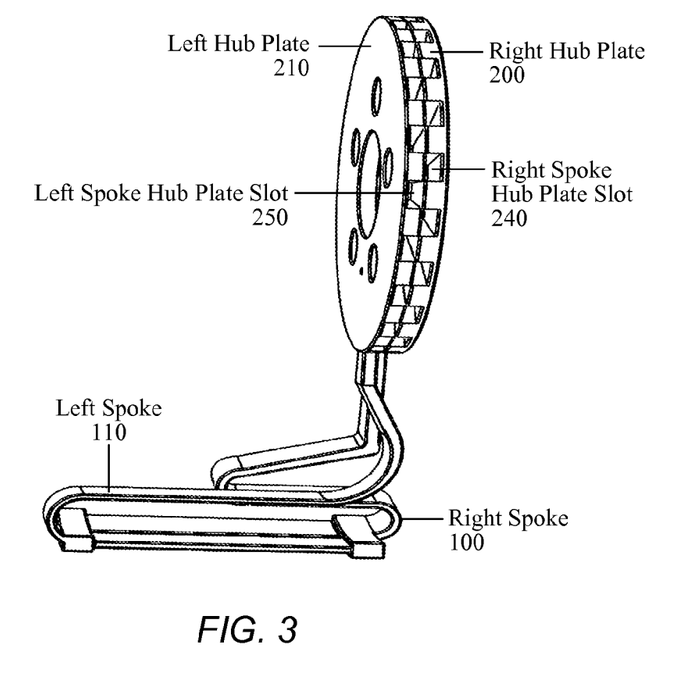
FIG. 3 is a side diagrams of one embodiment of a locked pair of curved, compressible radial spokes (100 and 110) which include a bottom, lateral plates (120 and 130) and locking slots (140 and 150) mounted into slots (240 and 250) of center set of circular hub plates (200 and 210)
Figure 4:
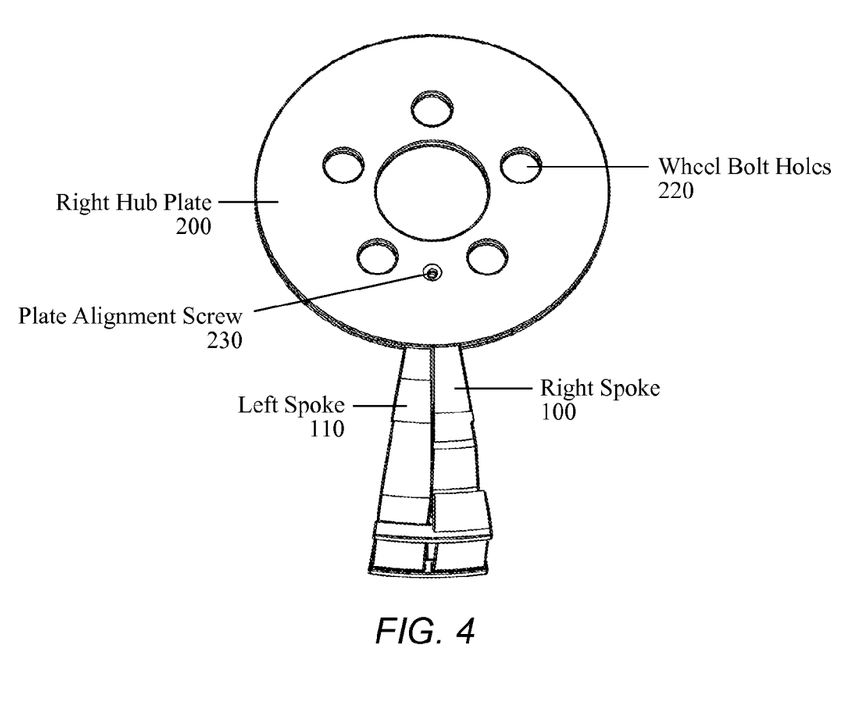
FIG. 4 is a front facing diagram of one embodiment of a pair of curved, compressible radial spokes (100 and 110) which are mounted to a center set of hub plates (200 and 210) with standard wheel mounting holes (220) showing an optional alignment screw (230)

Embodiments of the invention relate to a tire apparatus as described herein. FIG. 1 and FIG. 2 illustrate a single pair of compressible radial spokes (100 and 110) that can be locked together in the radial direction by mating interlocking members. As illustrated, the lateral plate (120 and 130) may be mated with the locking slot (140 and 150) on the alternate spoke. FIG. 3 shows this pair of spokes mated and mounted into a pair of hub plates (200 and 210). FIG. 4 shows the same structure in a frontal view. The compressible spokes provide a replacement or partial replacement for the air in pneumatic tires. One embodiment of the invention uses interlocking pairs. This structure provides the ability for the left compressible spoke and the right compressible spoke to provide better control of the tire displacement than single compressible spokes by creating a locking lateral plate structure (FIGS. 2: 120, 130, 140 and 150). In addition, the tire members, e.g., the lateral plates (120 and 130), can in one embodiment, provide a mounting mechanism to the tire or rim structure shown in detail in FIG. 8b, FIG. 12b and FIG. 14.

In one embodiment, the right and left spokes each comprise a hub member, illustrated as a radial retention tab (180 and 190), to improve retention of the spoke in half hub plates (200 and 210). In FIG. 1, each spoke also may contain at least one spring, e.g., curved or other shaped segments or compressible sections (160 and 170) which provide the specific compression characteristics required for a specific embodiment of this invention. In certain embodiments, the spoke may contain multiple, or a plurality of springs, which provide the specific compression characteristics required for a specific embodiment of this invention. The shape may or may not be similar from left to right members in a spoke pair. Further, each spoke includes a tire member, illustrated as a lateral plate (120 and 130) and a pairing member, illustrated as a plate locking slot (140 and 150). Once the Right Lateral Plate (120) slides into the Left Plate Locking Slot (150) and the Left Lateral Plate (130) slides into the Right Plate Locking Slot (120), the spoke pair static and dynamic displacement are fixed together at the area of the tire or rim mounting structure (described in more detail later).

Figure 5:
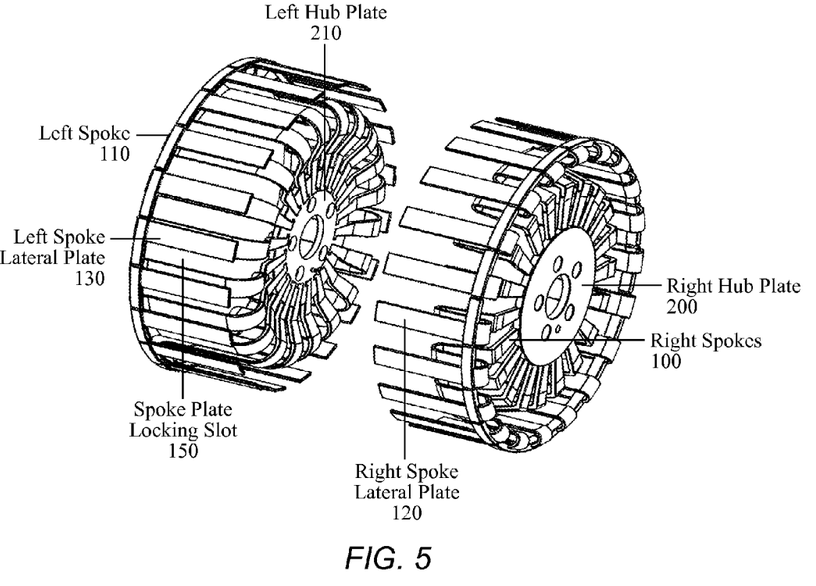
FIG. 5 is a diagram of one embodiment of a left and right half wheel assembly separated in the axial direction. Each half contains evenly spaced curved, compressible radial spokes which mate or lock with its pair on the alternate half.

In FIG. 5, the left and right half wheel structures are shown. The left half wheel is constructed of multiple left spokes (110) spaced apart and mounted onto the left hub plate (210) in the radial direction. The right half wheel is constructed of multiple right spokes (100) spaced apart and mounted onto the right hub plate (200) in the radial direction. The spacing of the spokes may or may not be equal to avoid resonant noise generation. Again retention tabs (180 and 190) may be present. The outer ring of each half wheel comprises the spoke lateral plates (Left 130 and Right 120, respectively). The resulting structure fits together somewhat like the fingers of left and right hands.

Figure 6:
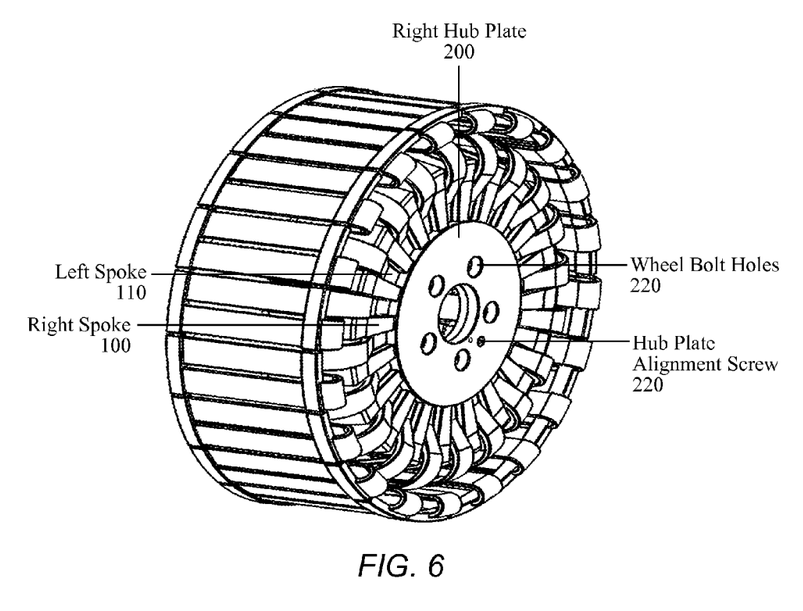
FIG. 6 is a diagram of one embodiment of a wheel formed by left and right half wheels constructed of locked pairs of curved, compressible radial spokes.
Figure 9:
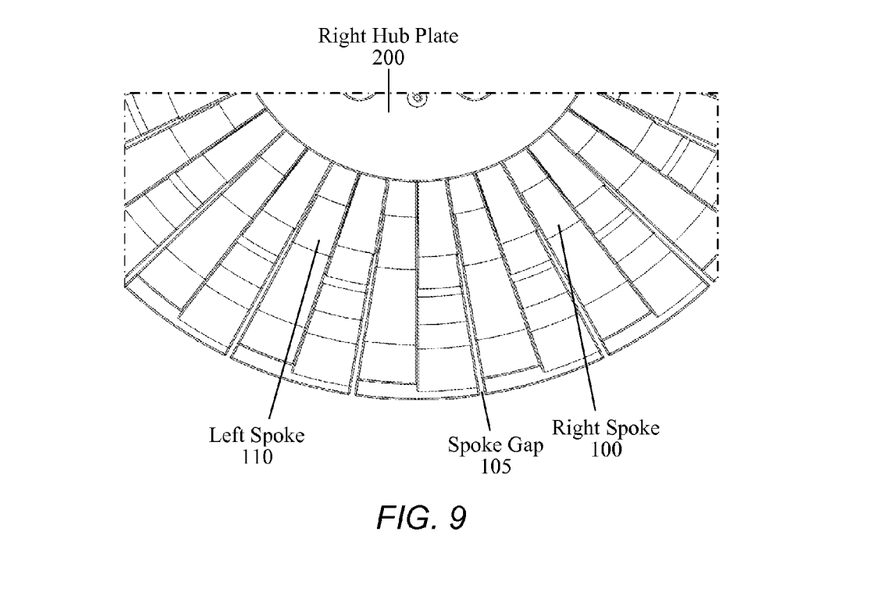
FIG. 9 is a front facing diagram of one embodiment of a wheel configuration that show the required gap necessary to allow radial compression. The gap may only be present over the compressible section of the spokes.

By sliding the left and right halves of the wheel structure together as shown in FIG. 6, a more recognizable wheel structure is formed. This wheel contains locked pairs of compressible radial spokes. For these spokes to be compressible in the radial direction, gaps are preferably provided between the spokes over the radial section that is permitted to compress. FIG. 9 shows a spoke gap (105) extending from the outermost radial portion of the wheel structure inward toward the center of rotation. This gap size and length can be adjusted to limit and manage the compression of the wheel structure.

Figure 7A:
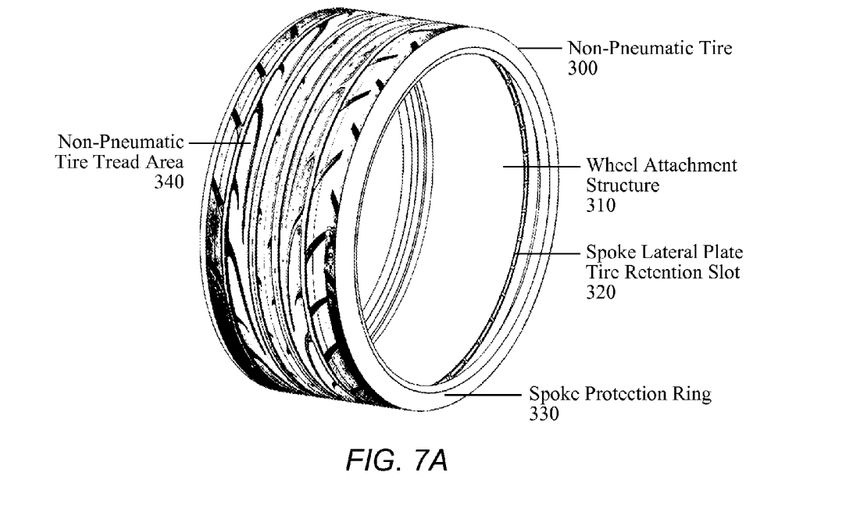
Figures 7B, 7C:
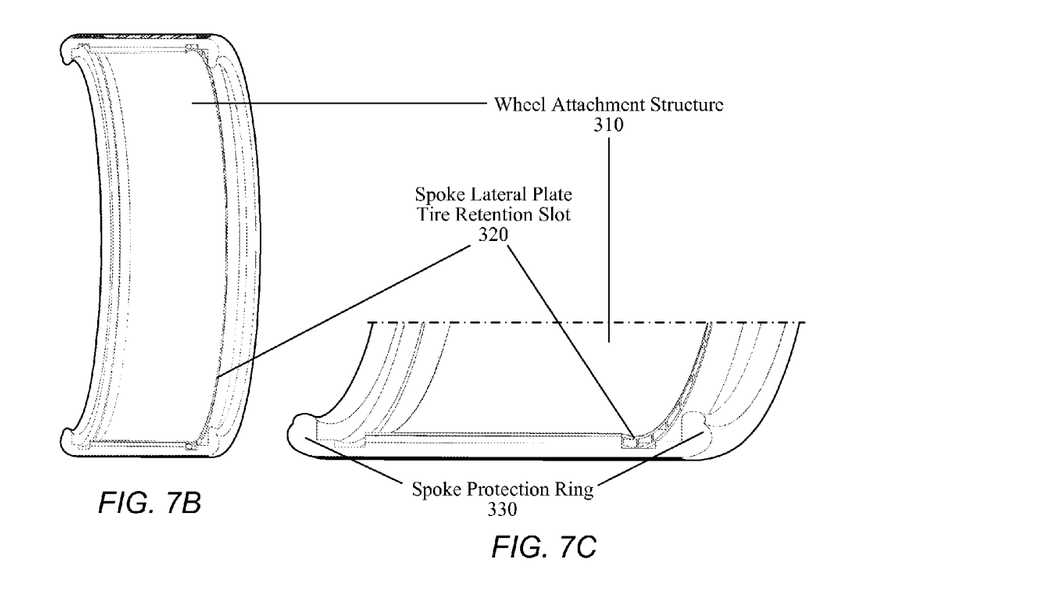

FIG. 7a, FIG. 7b and FIG. 7c illustrate one embodiment of a mating non-pneumatic tire which comprises an outer tire tread area (340) and an inner wheel attachment structure (310). The wheel attachment structure comprises multiple spoke lateral plate retention slots (320). In addition, the tire structure may contain an outer set of left and right side rings (330) to protect the spokes. These rings may also contribute to lateral tire to wheel retention as well as spreading lateral forces among multiple spoke pairs. This retention ring may be integrated into the tire or debris shield or be a separate structure.

Figure 8A:
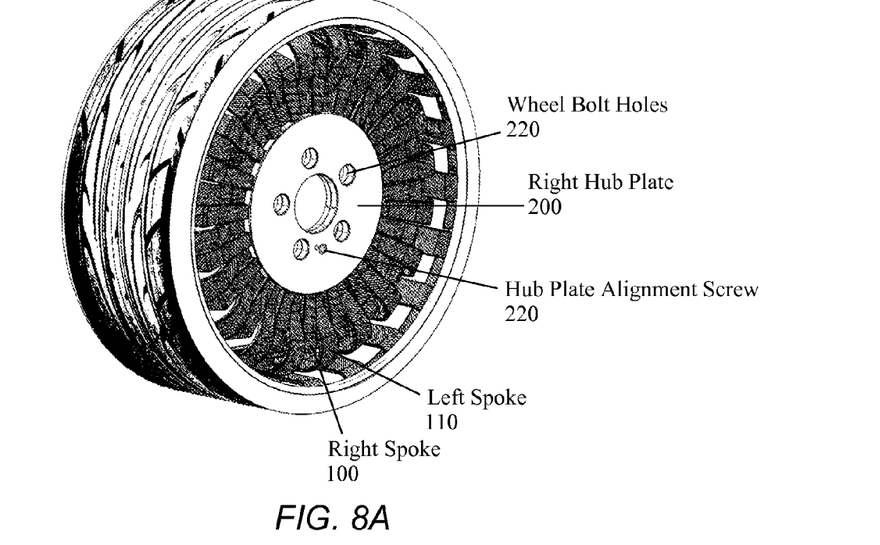
Figure 8B:
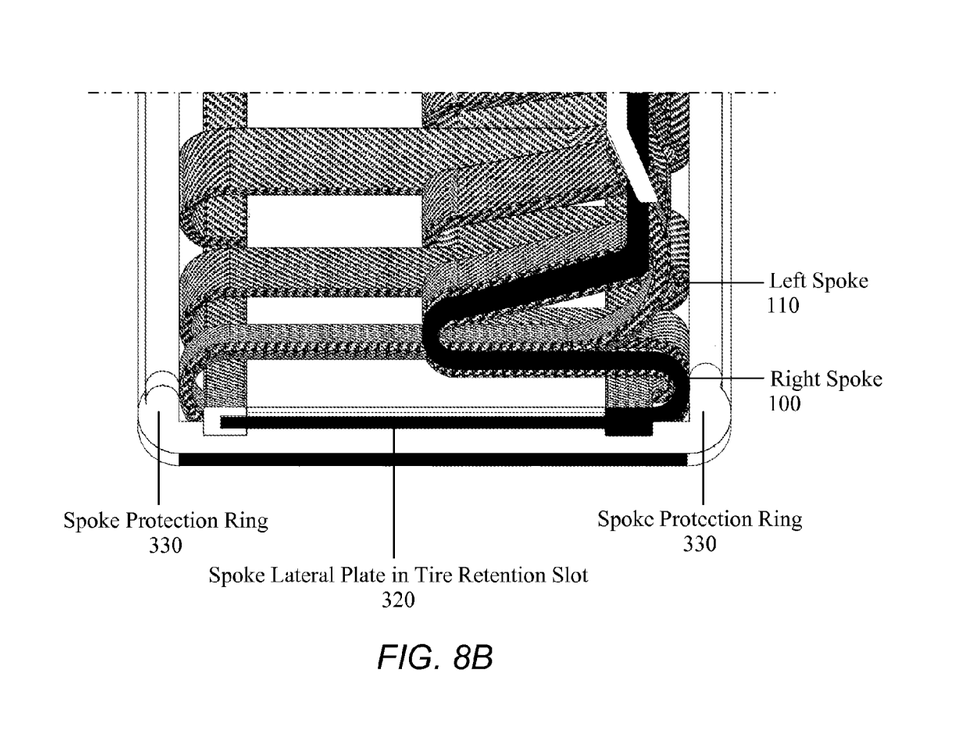
FIG. 8b shows a close-up, cut away view of the spoke locking structures on the bottom plate of the spokes inserted into the mating tire retention slots (320)

FIG. 8a shows the complete wheel and non-pneumatic tire assembly. This is formed by sliding the left half wheel show in FIG. 5a into the tire attachment structure. In the embodiment shown, this comprises sliding each of the left spoke lateral plates (130) into the spoke lateral plate tire retention slots (320). Additionally, the right half wheel has its right spoke lateral plates (120) slid or pressed into the tire retention slots (320). Once this process is complete, the outer structure of the wheel, including the lateral plates (120 and 130) are fit into the mating structures of the tire, including the tire's plate retention slot (320) show in FIG. 8b and the spoke protection rings (330).

FIG. 9 shows a close up of the gap that may be necessary to allow radial compressible spokes to move inward toward the center of the wheel structure.

Figure 10:
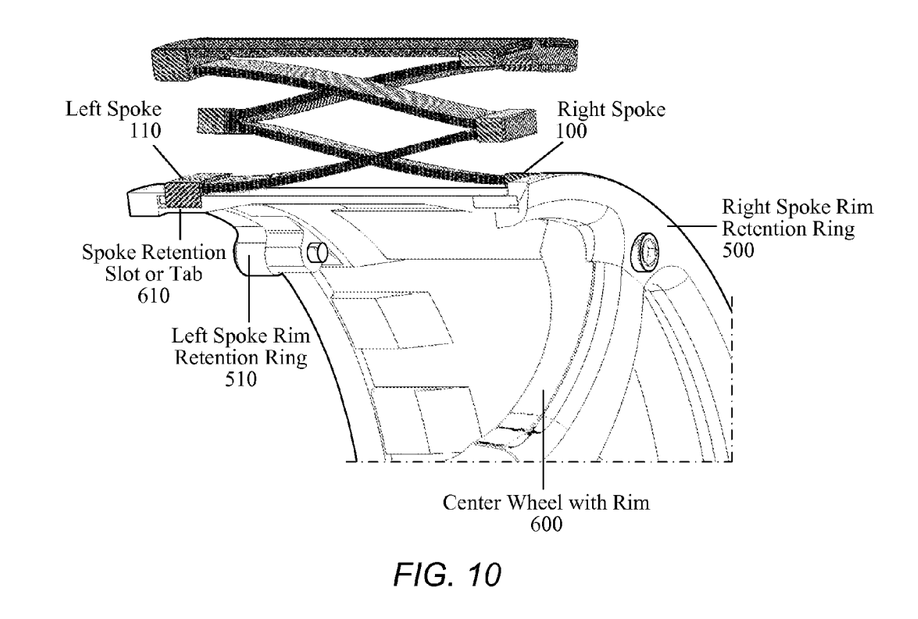
FIG. 10 shows a diagram of an alternative embodiment utilizing locked pairs of curved, compressible radial spokes mounted on a central wheel structure containing a rim (600) and spoke retention slots (610) and spoke retention rings (510 and 520). A single spoke pair is visible to highlight the paired nature.

FIG. 10 shows an alternative embodiment of a non-pneumatic tire and wheel system showing only two of the spokes (one pair) mounted on a more conventional center wheel structure. This diagram is meant to highlight the paired nature of the spokes as well as to highlight one embodiment of the slot or tab structure used to mount the spoke to the center wheel structure.

Figure 11:
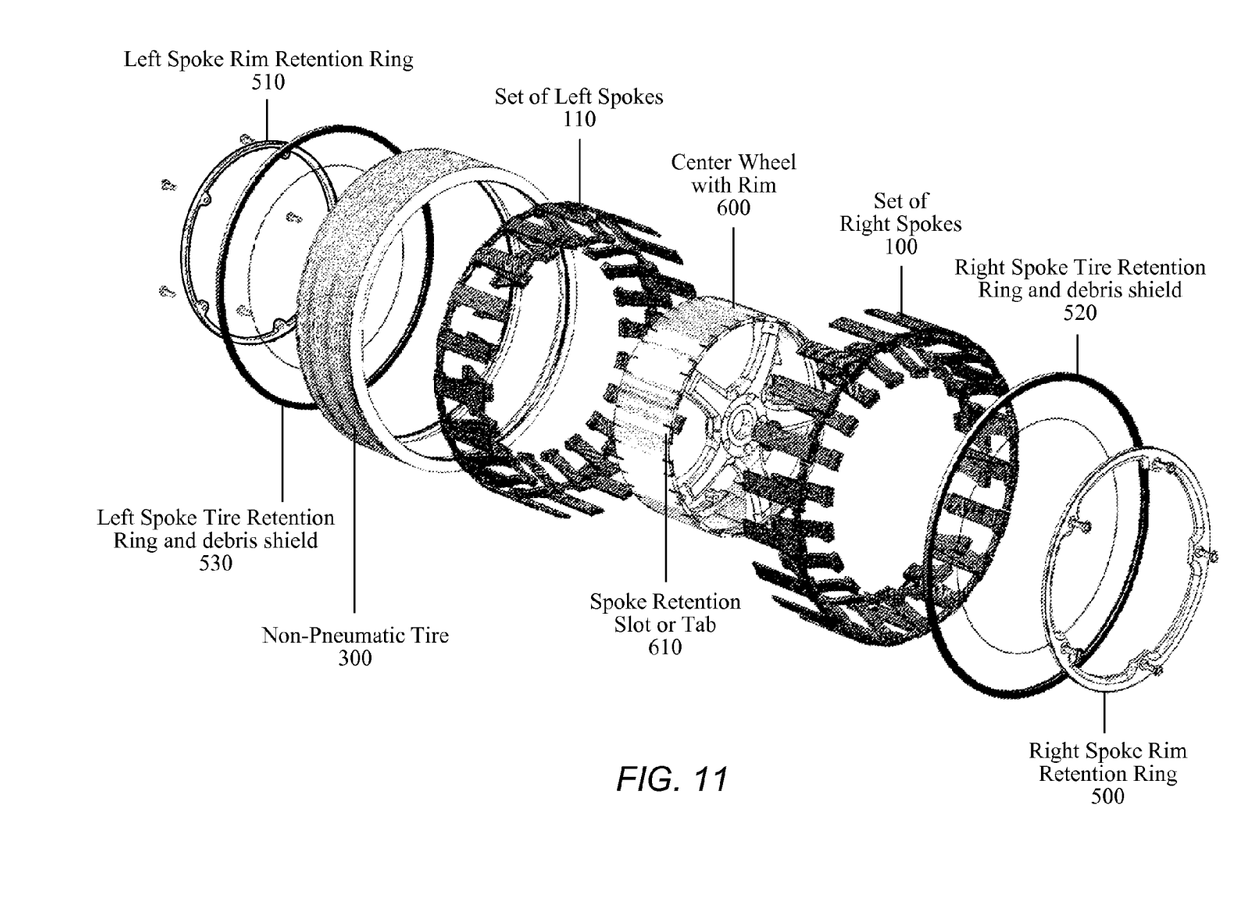
FIG. 11 shows an exploded diagram of an alternative embodiment of a non-pneumatic tire utilizing locked pairs of curved, compressible radial spokes mounted on a central wheel structure containing a rim (600) and spoke retention slots (610) and spoke retention rings (510 and 520). The diagram also depicts a pair of Tire Retention Rings with Debris Shield (520 and 530)

FIG. 11 shows an exploded view of this alternate embodiment of a non-pneumatic tire and wheel system. In this embodiment, rather than the radial compressible spokes mounting to a hub plate, they mount to a slot retention system (610) located on a wheel rim (600). Similarly to the embodiment presented above, this embodiment utilizes locked pairs of spokes that are inserted into the tire retention slot (320). In this embodiment, a pair of tire retention rings (520 and 530) may be implemented to provide clearance for spoke insertion prior to inserting these rings into the tire structure. This ring may be integrated with a debris shield as shown in this diagram. In addition, a left rim retention ring (510) holds the spokes into the retention slots (610) of the center wheel rim (600) from the left side. A complimentary structure, the right rim retention ring (500) mounts to the center wheel rim (600)

on the right side and retains the right spoke set into the wheel rim (600) and retention slots (610).

Figure 12A:
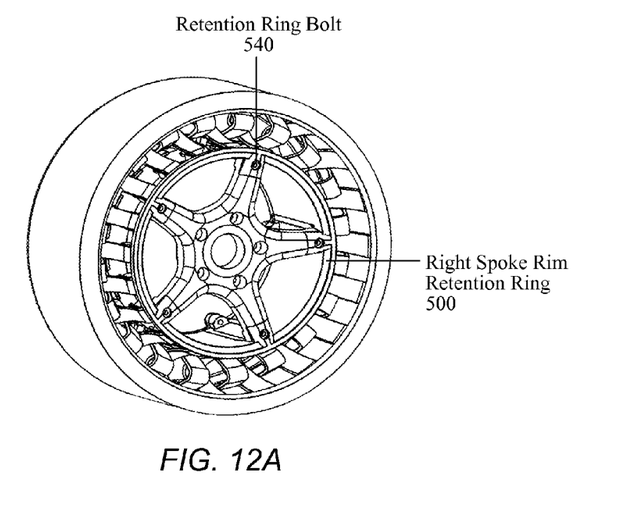
FIG. 12a shows the non-exploded view of the embodiment in FIG. 11
Figure 12B:
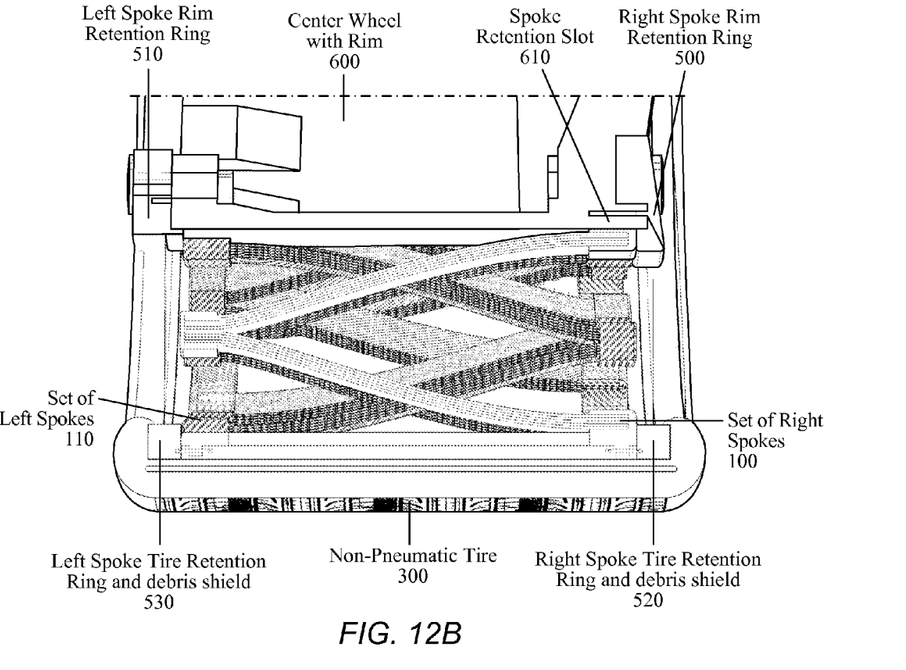
FIG. 12b shows a cross sectional view of FIG. 12a to show the parts fit together.

FIGS. 12a and 12b show the same alternate embodiment as in FIG. 11, but not exploded. FIG. 12a shows the side view showing the standard looking wheel with the addition of the right rim retention ring (500) and bolts (540). FIG. 12b shows the same parts as in FIG. 11, but in a cross sectional view of the non-pneumatic wheel and tire structure.

Figures 13A, 13B:
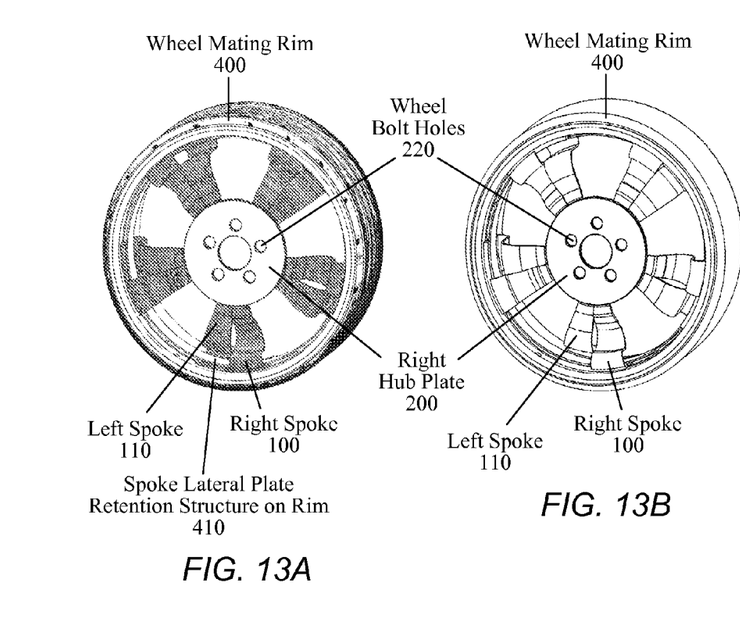
FIGS. 13a and 13b are two front facing diagrams (solid and wire, respectively) of an alternate embodiment of wheel and tire configuration which includes supporting rim structure (400) containing lateral plate retention structure (410)
Figure 14:
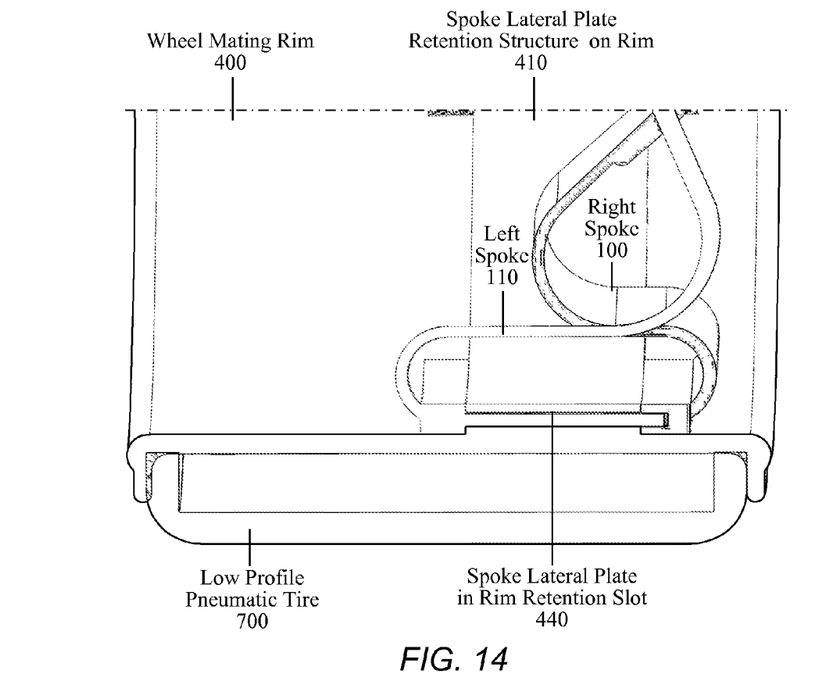
FIG. 14 shows the close-up cut away view of the wheel and low profile pneumatic tire (700) in FIG. 12a which shows the spoke lateral plate retention structure on the rim (410), instead of the tire as in FIG. 8b. The diagram also shows the spoke lateral plates within in the rim retention slot (440).
Figure 15:
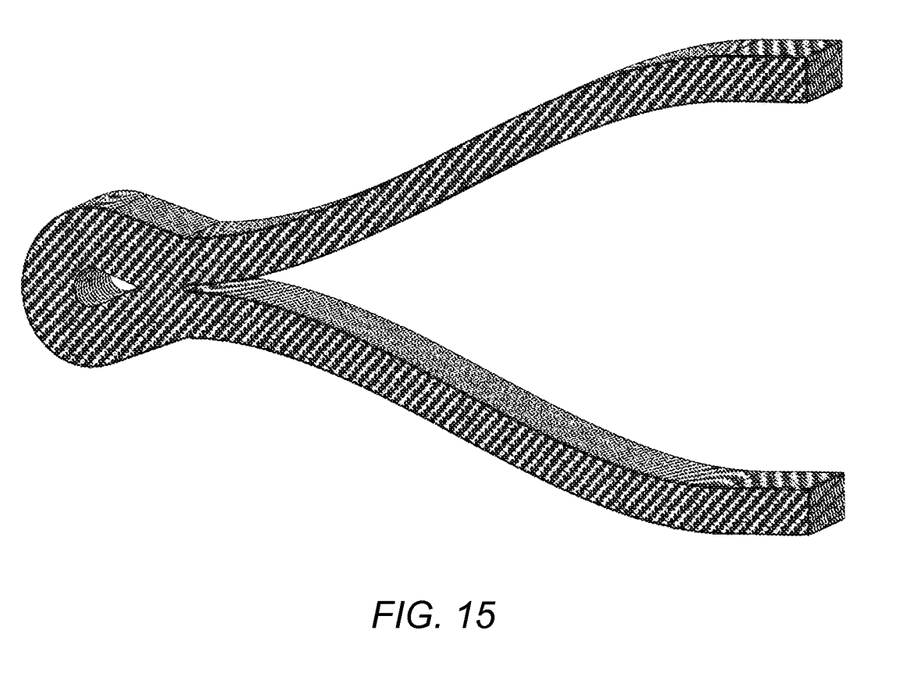

FIG. 13a, FIG. 13b and FIG. 14 illustrate an alternate embodiment. FIG. 13a and FIG. 13b show a system including a wheel rim (400) which mates to the spoke pair system using a similar retention mechanism (410) to the non-pneumatic tire. This embodiment enables the use of either standard pneumatic tires or any tire specifically designed to mount on a mating rim structure. By use of a wheel rim (400) structure, the requirement for the spoke pairs to be narrow and fill the entire ring of the wheel structure is reduced or eliminated. This embodiment retains the advantages described above of paired spokes which lock together to improve their compressibility characteristics. In addition, this system may make use of the same lateral plate system which retains the rim (in the previous example, tire) through the use of rim retention slots (440) shown in close up form in FIG. 14.

The wheel and rim configuration can provide improved ride quality with the use of low-profile tires or it can provide additional compressibility for harsh wheel and tire environments like off-road vehicles encounter.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wheel apparatus, comprising:
    a wheel that is adapted to be coupled to a vehicle, wherein the wheel includes a hub;
    a plurality of pairs of spokes, wherein each of the spokes comprises:
    a hub member configured to attach to the hub of the wheel,
    at least one spring attached to the hub member;
    an interlocking member coupled to the at least one spring;
    wherein the at least one spring of each of the spokes in a pair are configured in an opposing manner to provide balance to the apparatus;
    wherein interlocking members of corresponding spokes in a pair are adapted to interlock together;
    wherein at least one of the interlocking members in the pair is configured to attach to a tire; and
    wherein the at least one of the interlocking members in the pair comprises slots adapted to mate with corresponding slots on the tire.

2. The wheel apparatus of claim 1,
    wherein the at least one of the interlocking members in the pair is configured to removably attach to the tire.

3. The wheel apparatus of claim 1,
    wherein each of the interlocking members in the pair is configured to attach to the tire.

4. The wheel apparatus of claim 1,
    wherein each of the interlocking members in the pair comprises:
    a tire member that is adapted to attach to the tire; and
    a pairing member attached to the tire member and adapted to interlock or secure the respective interlocking members of the pair of spokes.

5. The wheel apparatus of claim 1,
    wherein for at least a subset of the plurality of pairs of spokes, a first respective tire member of a pair of spokes is offset relative to a radial position of the first respective tire member's corresponding tire member of the pair.

6. The wheel apparatus of claim 1,
    wherein each of the spokes comprises a plurality of springs.

* * * * *